Sept. 25, 1951  R. A. LEACH  2,569,382
AWARD DISPENSING MACHINE
Filed Jan. 21, 1946
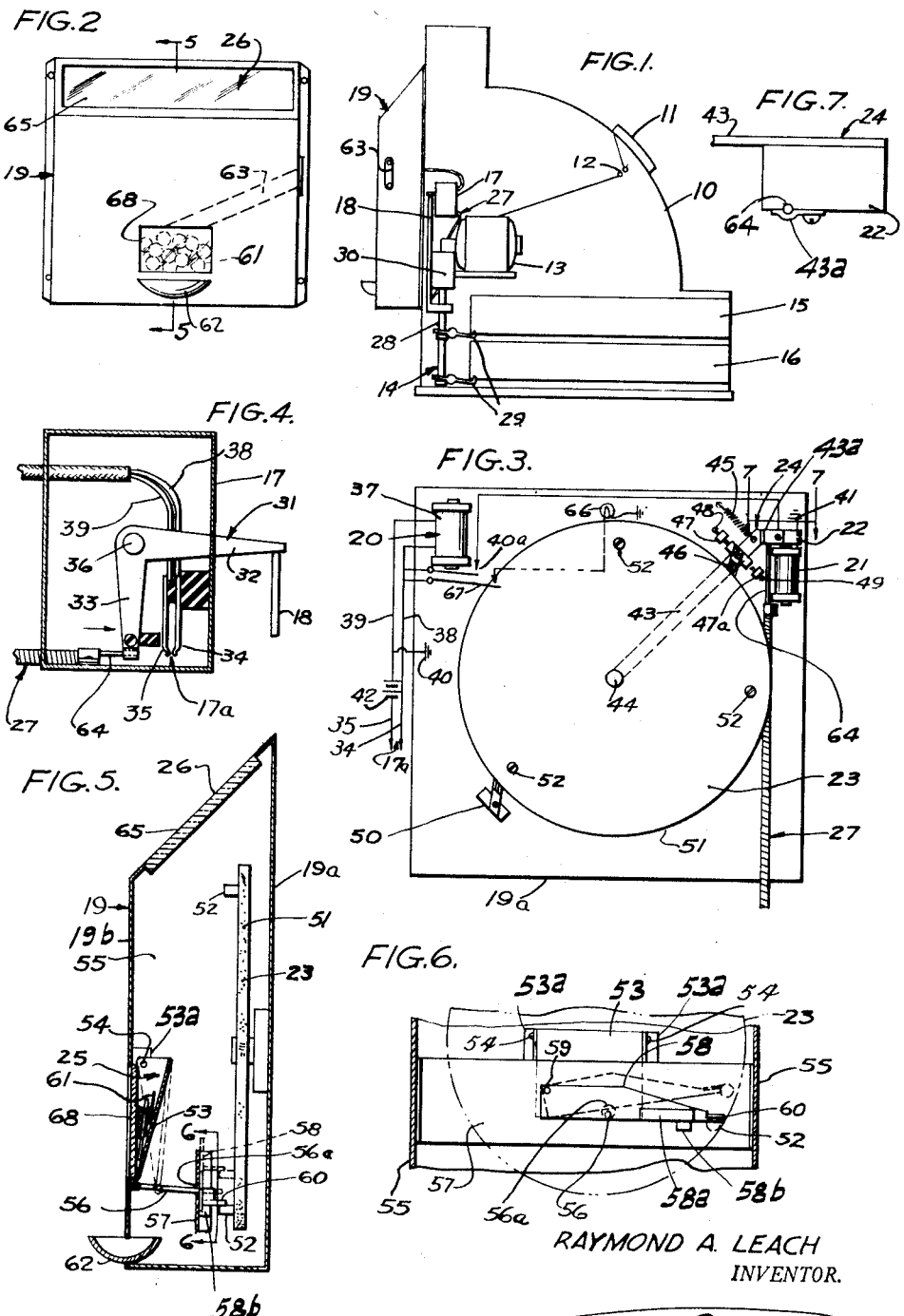
RAYMOND A. LEACH
INVENTOR.
ATTORNEY Patented Sept. 25, 1951

2,569,382

UNITED STATES PATENT OFFICE 2,569,382

AWARD DISPENSING MACHINE

Raymond A. Leach, Los Angeles, Calif.

Application January 21, 1946, Serial No. 642,502

11 Claims. (Cl. 273—138)

1

This invention relates to sales promotion devices and deals more specifically with an award or dividend dispensing mechanism and to such a mechanism as combined with a cash register or similar actuable machine.

In addition to stimulating sales, the present invention also contemplates and has for an object to provide means whereby a customer at a mercantile establishment, when paying the amount of a sales slip or check, retains interest in the registering of said amount by the cashier on a cash register or the like, thereby obviating losses to the establishment of diverted sales payments.

In order to retain the interest of the customer in the proper completion of the sales transaction, the invention contemplates the provision of mechanism combined with a cash register for dispensing an award of dividend to a customer as a sales transaction is rung up on the register and providing said mechanism with means controlled by the register for dispensing an award for indeterminately spaced sales.

Another object of the invention is to provide an award dispensing mechanism embodying novel means for dispensing awards in indeterminately spaced intervals as controlled by sales registering operations.

Other objects of the invention are to provide mechanism of the character referred to which embodies manual means for shortening the interval between dispensing of awards; novel and improved means for automatically resetting the award containing hopper from dispensing to award holding position; means for replenishing the award containing hopper; means embodying attention attracting advertising media; means which cannot be set or fixed by an individual to function at a predetermined or given time; and to provide a machine improvement which may be mechanically or electrically operated in combination with a new and different switch control which may be disposed in a local or remote position but still will enable it to be operated mechanically or electrically.

The invention has for its further objects to provide such means that are positive in operation, convenient in use, easily installed in working position and easily disconnected therefrom, economical of manufacture, relatively simple, and of general superiority and serviceability.

The invention also comprises novel details of construction and novel combination and arrangements of parts, which will more fully appear in the course of the following description. How-

2 ever, the accompanying drawing merely shows and the description merely describes one embodiment of the present invention which is given by way of illustration or example only.

In the drawing:

Fig. 1 is a semi-schematic side view of a combined cash register and award dispensing mechanism embodying my invention.

Fig. 2 is a face view from the customer's side of the combined machine of the award dispensing mechanism.

Fig. 3 is a face view of the dispensing mechanism with the cover thereof removed and drawn to an enlarged scale.

Fig. 4 is an enlarged sectional view of a switch box showing a cash register controlled switch mechanism for effecting operation of the award dispensing mechanism.

Fig. 5 is an enlarged vertical sectional view taken on line 5—5 of Fig. 2.

Fig. 6 is a fragmentary transverse sectional view taken on line 6—6 of Fig. 5, a portion of the operating disk being shown in phantom therebehind.

Fig. 7 is an enlarged plan view taken on a plane indicated by the line 7—7 of Fig. 3.

The machine of the present invention may be said to comprise, generally, a cash register or equivalent mechanism 10 equipped in a conventional manner with a sales recording pressing bar 11 adapted to close a switch 12 for energizing a motor 13, said motor in turn actuating means 14 releasing cash drawers 15 and 16. For the purposes of the present invention the cash register is provided with a casing 17 for enclosing the switch mechanism operable by a connection 18 operatively related to the means 14; and an award dispensing mechanism housing 19 secured to the rear or customer's side of the cash register 10.

The dispensing mechanism in the housing 19 comprises, generally, a relay 20 controlled by the switch 17a, a solenoid 21 controlled by said relay, an armature 22 associated with said solenoid, a rotatable wheel or disk 23, means 24 controlled by the movement of the armature 22 to cause indeterminate rotation of the wheel 23, an award dispensing hopper mechanism 25 actuated by said wheel, display means 26 adapted to be illuminated each time a cash sale is registered in the cash register 10, and auxiliary mechanical means 27 operated by the connection 18 to control movement of the advancing means 24.

The means 14 includes a bar 28, drawer catches 29, and conventional mechanism generally designated by the numeral 30 operable by the motor 13 to cause vertical movement of the bar 28. The connection 18 is operatively connected to the bar 28 so as to move therewith.

Upon depressing the pressing bar 11 closing switch 12, the motor 13 will move the bar 28 to cause release of the catches 29 so that the drawers 15 and 16 can be opened either manually or automatically. The vertical movement of the bar 28 together with the connection 18 causes actuation of the switch 17a.

The switch mechanism 17a comprises, essentially, a bell crank lever 31 having an arm 32 in the path of movement of the conection 18, and an arm 33 is arranged to control the closing of said switch mechanism 17a through the medium of the switch arms 34 and 35. The bell crank lever 31 is pivoted at 36 so that the rocking thereof by upward movement of connection 18, causes its arm 33 to press the switch arm 35 into electrical contact with the switch arm 34.

The relay 20 includes an electro-magnetic coil 37 connected in series with the switch arms 34 and 35 by conductors 38 and 39. One conductor is grounded at 40 and the other is connected to the solenoid 21 through a switch 40a controlled by the relay coil 37. The other end of the solenoid is grounded at 41.

Upon closing the switch arms 34 and 35, the relay coil 37 is energized by the current source 42 to cause closing of the switch 40a and energization of the solenoid 21. The resultant attraction of the armature 22 by the solenoid 21 will cause actuation of the means 24 and cause the latter to partially rotate wheel 23.

The means 24 comprises a radially extending arm 43 pivoted at 44 to the axis of the disk and carrying the armature 22 at its end. Means such as a tension spring 45 has one of its ends connected to the wall 19a and its opposite end connected to the arm 43 to oppose the pull of the arm 43 by the solenoid when energized. The arm 43 is provided with a driving dog 46 having a plurality of resilient blades disposed to engage the periphery of the wheel 23 and blocks 47 and 47a fastened to the back wall 19a of the housing 19 respectively have mounted therein adjusting screws 48 and 49 between which the travel of the arm 43 is limited.

From the foregoing it will be seen that energization of the solenoid 21 will swing the arm 43 about its axis to cause the resilient blades of the dog 46 to drive the wheel 23 on its axis until it encounters the abutment screw 49. De-energization of the solenoid will permit the spring 45 to become effective to cause normal recovery of the arm 43 and dog 46 as controlled by the abutment screw 48. By suitable adjustment of the screws 48 and 49 in their respective mounting blocks 47 and 47a a desired rotational increment of the wheel 23 may be effected.

To prevent undue spinning of the wheel on its axis 44, a holding dog 50 fastened to the wall 19a having a plurality of resilient blades to play on the wheel's periphery is also provided.

In order that the driving increments shall vary so that an unpredictable number of movements of the wheel 23 will effect operation of the hopper mechanism 25, the periphery 51 of the wheel is promiscuously roughened as shown in Figure 5. Hence sooner or later the dog 46 obtains a foothold on the wheel and turns it causing a pin or pins 52 projecting inwardly of the casing laterally from the wheel 23 to encounter the hopper mechanism 25 to cause release of its contents for varying numbers of operations of the pressing bar 11. This promiscuous roughening of the wheel prevents setting of the device so that the contents will be released at any predetermined time. Hence the owner of the machine cannot fraudulently cheat a customer by setting the release to act at a time when he desires.

The hopper mechanism 25 comprises a tiltable award holding hopper 53 pivoted at 54 to angles 53a secured to the front panel 19b of the casing 19 as shown in Figs. 5 and 6, a rod 56 extending from the lower side of the rack through an aperture 56a in the wall 57, and a weighted arm 58 pivoted at 59 on the wall 57 and having its free end provided with an extension 60 projecting into the path of movement of the pin or pins 52. Plate 57 is secured to the side walls 55 of the casing 19 in any suitable manner desired. Said weighted arm functions as a moveable stop member which normally obstructs the movement of rod 56.

Normally, the arm 58 engages the free end of the rod 56 to cause the swinging lower portion of the hopper 53 to be contiguous to the housing wall 19b and thereby serve as a hopper for tokens or other items 61. Upon one of the pins 52 during travel of the disk 23 encountering and lifting the extension 60 of the weighted arm 58 to move the same out of engagement with the point portion of the rod 56, the weight of the items 61 will become effective to tilt the hopper 53 resulting in a spilling of said items into a dispensing cup 62 available to the customer the registration of whose sales payment had caused the release of the rod 56. Upon immediate release of the award the hopper 53 gravitates to normal position with the point of the pin 56 again resting in the aperture 56a of the plate 57. The hopper 53 has an open side directed toward a wall portion of the casing.

The arm 58 is weighted at 58a so that it normally seeks a position with its lower edge in contiguity with the stop 58b secured to the plate 57. As subsequent sales are recorded to release extension 60 from the pin 52 the weighted arm 58 will be released to fall again into a rest position with the stop 58b wherein the rod 56 is restricted from movement when items are once more placed in the hopper 53 until subsequent release by contact of a pin 52 with the extension 60. The subsequent placing of items 61 into the hopper after it is once released from its holding position is performed through the medium of the chute 63.

In order to actuate the driving dog 46 independently of the electrical apparatus previously described it is desired to provide some mechanical means, such for example, as the means indicated by the numeral 27 in Figs. 1, 3 and 4. Accordingly, a Bowden wire conection 64 is made between the arm 33 of the bell crank lever 31 and the arm 43, a clamp 43a being employed to secure one end of the wire 64 operatively to said arm 43. Upon actuation of the bell crank lever by the connection 18, the wheel 23 will partially rotate as hereinbefore described.

The means 26 may comprise a transparent or translucent panel 65 having legend or indicia thereon. An electric lamp 66 having one side grounded and the other connected through a switch 67 controlled by the relay 20 serves to illuminate the panel 65 as each sale is recorded in the cash register 10.

The customer is further attracted in a manner to cause his following the completion of the recording of his purchase by providing a transparent panel 68 in the front wall of the housing 19 and in front of the hopper. The contents of the hopper 25 may be readily seen through the panel 68 to arrest the attention of the customer.

While I have illustrated and described what I now regard as the preferred embodiment of my invention, the construction is, of course, subject to modifications without departing from the spirit and scope of my invention. I, therefore, do not wish to restrict myself to the particular form of construction disclosed, but desire to avail myself of all modifications that may fall appropriately within the scope of the appended claims.

I claim:

1. In an award dispensing mechanism, a casing including a wall portion, an award holding hopper mounted on said casing and pivoted to swing in a pendulous manner from and to an overlying relation to said wall portion of the casing, said hopper having an open side directed toward said wall portion so that when the lower end of the hopper is allowed to swing away from said wall portion the contents of the hopper gravitates downwardly, whereupon after the release of said contents the hopper automatically gravitates back to its normal position, a wheel rotatably mounted upon said casing, a pin carried eccentrically by said wheel and projecting laterally therefrom, a horizontally extending rod one end of which is connected to the lower part of said hopper, a plate mounted upon said casing and having an apertured part within which is supported the opposite end of said rod, and an arm swingably attached to said plate and laterally overlying said aperture in which the end portion of said rod is seated normally to prevent outswinging of said hopper, said swingable arm being movable from its normal position by contact of said pin therewith to uncover said aperture to release said rod and thereby discharge the contents of said hopper, whereupon said swingable arm gravitates back to its normal position.

2. In an award dispensing mechanism, a casing including a wall portion, an award holding hopper mounted on said casing and pivoted to swing in a pendulous manner from and to an overlying relation to said wall portion of the casing, said hopper having an open side directed toward said wall portion so that when the lower end of the hopper is allowed to swing away from said wall portion the contents of the hopper gravitates downwardly, whereupon after release of said contents the hopper automatically gravitates back to its normal position, a wheel rotatably mounted upon said casing, a pin carried eccentrically by said wheel and projecting laterally therefrom, and means connected with said hopper releasably to hold it in its said normal position, said hopper holding means including a part in the path of said pin, engagement of said pin with said part effecting an intermittent release of said hopper holding means.

3. In an award dispensing mechanism, a casing, award containing means mounted on said casing for containing a quantity of items constituting the award, said containing means being movable from a containing to a discharging position and back to containing position after discharging its contents, a rod carried by said containing means, means releasably holding said rod against movement so as normally to prevent said containing means from moving to the item discharging position, said releasable holding means comprising a stop member normally obstructing the movement of said rod toward releasing position, and means mounted upon said casing to move said stop member from an obstructing position in relation to said rod to release the latter to discharge the contents from said containing means.

4. The subject matter of claim 3 and, the latter means comprising a wheel carrying a part which at each rotation of the wheel engages said stop member and moves it against gravity out of engagement with said rod.

5. The subject matter of claim 3 and, the latter means comprising a wheel carrying a part which at each rotation engages a stop member and moves it against gravity out of engagement with said rod, a dog movably supported by the casing in a position to impart a step-by-step rotation to said wheel, electric means for operating said dog including a solenoid having an armature, an electric switch connected with and controlling operation of said solenoid, said armature being disposed with relation to said dog so that the latter moves downwardly each time said armature is attracted, thus causing said dog to turn the wheel one step by acting upon the periphery thereof, a bell crank lever rockably mounted upon said casing, said bell crank lever being operative to close the switch and complete the circuit through said solenoid whenever said bell crank lever is operated, and means manually to operate said bell crank lever to operate said dog and wheel as aforesaid, the latter means being positioned for being acted upon by the impact of an outside object thereagainst.

6. The subject matter of claim 3 and, the latter means comprising a wheel carrying a part which at each rotation engages a stop member and moves it aganist gravity out of engagement with said rod, a dog movably supported by the casing in a position to impart a step-by-step rotation to said wheel, and electric means carried by said casing for operating said dog.

7. The subject matter of claim 3, and, the latter means comprising a wheel carrying a part which at each rotation engages a stop member and moves it against gravity out of engagement with said rod, a dog movably supported by the casing in a position to impart a step-by-step rotation to said wheel, and mechanical means carried by said casing and positioned for being acted upon by the impact of an outside object thereagainst for operating said dog.

8. In an award dispensing mechanism, a casing having vertical wall portions, an award containing hopper mounted on said casing in a pendulous manner to swing to and from an overlying relation to the inner face of one of said wall portions, said hopper having an open side directed toward said wall portion so that the weight of award items contained in the hopper tends to cause the latter to swing away from said wall portion thus by gravity downwardly discharging said items, a wheel rotatably mounted upon said casing, a pin carried eccentrically by said wheel and projecting laterally therefrom, a horizontally extending rod one end of which is connected to the lower part of said hopper, means mounted upon said casing and supporting the opposite end of said rod leaving the rod free to move in an endwise manner when otherwise unobstructed, a stop member movably mounted upon said casing and normally maintained by gravity engaging the end of said rod farthest from said hopper releasably to hold the latter from gravitating to item discharging position, said stop member being in the path of the aforesaid pin so that each time the wheel is rotated the pin engages said stop member and moves it against gravity out of engagement with said rod, and a dog movably supported by the casing and operative for imparting step-by-step rotation to said wheel.

9. The subject matter of claim 8 and, means carried by said casing and positioned for being acted upon by the impact of an outside object thereagainst for operating said dog.

10. In an award dispensing mechanism adapted for mounting on a cash register having a plurality of sliding drawers, a casing, award containing means mounted on said casing for containing a quantity of items constituting the award, said containing means being movable by gravity from a containing to a discharging position and gravitating back to containing position after discharging its contents, a rod carried by said containing means, means releasably holding said rod against movement so as normally to prevent said containing means from gravitating to the item discharging position, said releasable holding means comprising a stop member normally obstructing the movement of said rod toward releasing position, and means mounted upon said casing to move said stop member from a gravity maintained obstructing position in relation to said rod, the latter means comprising a wheel carrying a part which at each rotation of the wheel engages said stop member and moves it against gravity out of engagement with said rod, a dog carrying arm pivotally secured at one end to said casing in a position for its free end to swing about the axis of rotation of said wheel, a dog carried by said arm in a position to engage the periphery of said wheel to impart a step-by-step rotation to the latter, mechanism operative to effect movement of said pivoted arm in a direction to impart step-by-step rotation of the wheel, and a spring attached to the casing and the arm and operative to swing said arm in reverse non-driving movement.

11. In an award dispensing mechanism, a casing having vertical wall portions, an award containing hopper mounted on said casing in a pendulous manner to swing to and from an overlying relation to the inner face of one of said wall portions, said hopper having the open side directed toward said wall so that the weight of award items contained in the hopper tends to swing the hopper away from the wall to discharge said items by gravity, a wheel rotatably mounted on said casing, a pin carried eccentrically by said wheel and projecting laterally therefrom, a horizontally extending rod having one end connected to the lower part of said hopper, means mounted on said casing and supporting the opposite end of said rod so that the latter is free to move in an endwise direction when otherwise unobstructed, a stop member movably mounted upon said casing and normally maintained in engagement with the end of said rod farthest from said hopper to releasably hold the hopper from gravitating to item discharging position, said stop member being in the path of the aforesaid pin so that each time the wheel is rotated the pin engages the stop member and moves it against gravity out of engagement with said rod, a dog movably supported by the casing in a position to impart step-by-step rotation to said wheel, electric means for operating said dog including a solenoid and an armature, an electric switch connected with and controlling operation of said solenoid, said armature being connected to said dog so that the latter is moved in one direction each time the armature is attracted to the solenoid for turning the wheel, a bell crank lever rockably mounted on said casing, said bell crank lever being operative to close the switch and to complete the circuit through the solenoid, and manually operative means for actuating the bell crank lever.

RAYMOND A. LEACH.

REFERENCES CITED

The following references are of record in the file of this patent:

UNITED STATES PATENTS

| Number | Name | Date |
|---|---|---|
| 433,205 | Jones et al. | July 29, 1890 |
| 760,705 | Schinneller | May 24, 1904 |
| 1,001,795 | Yaxley | Aug. 29, 1911 |
| 1,600,088 | Burstyn | Sept. 14, 1926 |
| 1,946,736 | Frey | Feb. 13, 1934 |
| 2,090,225 | O'Brien | Aug. 17, 1937 |